US006807518B1

(12) United States Patent
Lang

(10) Patent No.: US 6,807,518 B1
(45) Date of Patent: Oct. 19, 2004

(54) METHOD FOR ANALYZING PRODUCT INFORMATION

(75) Inventor: Theodore James Lang, Canton, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 09/548,445

(22) Filed: Apr. 13, 2000

(51) Int. Cl.$^7$ .......................... G06F 7/60; G06F 17/10
(52) U.S. Cl. ................. 703/2; 707/104.1; 707/203; 705/26; 705/27; 703/22; 703/8
(58) Field of Search ............... 703/2, 8, 22; 707/104.1, 707/203; 705/26, 27

(56) References Cited

U.S. PATENT DOCUMENTS

| | | | | |
|---|---|---|---|---|
| 6,091,412 A | * | 7/2000 | Simonoff et al. ........... 345/749 |
| 6,278,965 B1 | * | 8/2001 | Glass et al. .................... 703/8 |
| 6,493,723 B1 | * | 12/2002 | Busche ..................... 707/104.1 |
| 6,581,068 B1 | * | 6/2003 | Bensoussan et al. ...... 707/104.1 |
| 6,609,108 B1 | * | 8/2003 | Pulliam et al. ............... 705/27 |
| 6,654,726 B1 | * | 11/2003 | Hanzek ....................... 705/26 |
| 6,678,678 B2 | * | 1/2004 | Lee et al. ...................... 707/3 |
| 6,728,685 B1 | * | 4/2004 | Ahluwalia ................... 705/26 |

OTHER PUBLICATIONS

Kurz et al, Data Warehouse within Internet:Prototype of a Web–Based Executive Information system, 1997, IEEE.*
Hahn et al., Automatically Generating OLAP Schmata from Conceptual Graphic Models, Nov. 2000, ACM.*

* cited by examiner

Primary Examiner—William Thomson
(74) Attorney, Agent, or Firm—David B. Kelley

(57) ABSTRACT

A method for analyzing vehicle information. The method utilizes a multi-dimensional relational database or a data cube and On Line Analytical Processing technology to integrate information which is acquired from various different sources and allows all of the data to be analyzed in an efficient, concise and unambiguous manner.

12 Claims, 1 Drawing Sheet

METHOD FOR ANALYZING PRODUCT INFORMATION

FIELD OF THE INVENTION

This invention generally relates to a method for analyzing product information and more particularly, to a method which utilizes a multi-dimensional database or "data cube" to organize and analyze various types of information or data relating to automotive vehicles.

BACKGROUND OF THE INVENTION

A wide variety of information is available and generated for products such as automotive vehicles. For example and without limitation, a large amount of data is available relating to the quality and cost of such products and to consumer concerns and desires. Companies that manufacture products such as vehicles typically gather, organize, examine and analyze information relating to every aspect of their business in order to determine and improve the quality of their manufactured products or vehicles, cut costs, address customer concerns, and provide innovations and features which customers desire. Due to the relatively large amount and variety of data that is available for products such as vehicles, it is relatively difficult to organize and analyze this data in an efficient and concise manner. Without the proper and efficient organization and analysis, the potential benefits and insight offered by this vehicle information cannot be realized.

Conventional data analysis methods, databases and systems, which are utilized by companies to analyze data, are relatively slow and inefficient. Particularly, current information systems and methods require users of such systems to learn a separate application (e.g., a separate software platform) for each source of data analyzed. For example and without limitation, vehicle warranty data, customer satisfaction data, customer concerns data, competitor data, and other data is typically generated by and available through separate sources, thereby requiring a user of this data to learn various applications or platforms to analyze each type of data. This further prevents the user from accessing and comparing these different types of data concurrently. Additionally, users of these prior methods and systems must typically import the data into other software to display the results in a graphical format (e.g., charts, graphs). Moreover, these prior systems require users to prepare and submit pre-defined queries to the resident databases prior to receiving information which can be analyzed. Due to these limitations, these present methods and systems require a user to develop or know which queries to submit and the expected results of these queries before submitting the queries. Furthermore, a user must procedurally chart the query results to obtain analysis that will determine "follow-up" queries. For these reasons, the information analysis that is performed using these prior methods and systems is unduly burdensome, inefficient and time consuming. As a result, the ability for companies to properly and efficiently provide improved quality and innovation of their products or vehicles is significantly limited.

There is therefore a need for a method for analyzing product information which overcomes the limitations of prior methods and systems and which allows the data from various sources to be efficiently integrated, organized, analyzed and displayed to a user in a concise and unambiguous manner.

SUMMARY OF THE INVENTION

It is a first object of the invention to provide a method for analyzing product information which overcomes the limitations of prior methods and systems and which allows the data to be to be analyzed, organized and accessed in an efficient manner.

It is a second object of the invention to provide a method for analyzing product information which integrates data generated from various sources into a single data system or data cubes and which allows all of the data to be concurrently accessed, searched and displayed in a simple and unambiguous manner.

It is a third object of the invention to provide a method for analyzing product information which utilizes a multi-dimensional database to allow a user to access different types of data in various user-selected formats.

It is a fourth object of the invention to provide a method for analyzing product information which provides a company with improved and more timely access to relevant product quality information relative to prior methods and systems.

According to a first aspect of the present invention, a method is provided for analyzing vehicle data. The method includes the steps of obtaining the vehicle data from a plurality of sources; formatting the obtained vehicle data; integrating the formatted vehicle data within a single data system having at least one data cube; selectively accessing portions of the vehicle data over a computer network, the accessed portions corresponding to a plurality of user selected attributes; and selectively displaying the accessed portions of the vehicle data in a unique one of a plurality of user-selectable formats.

These and other objects, aspects, features, and advantages of the present invention will become apparent from a consideration of the following specification and the attached drawings.

DETAILED DESCRIPTION OF THE PREFERRED EMBODIMENT OF THE INVENTION

Figure 1:
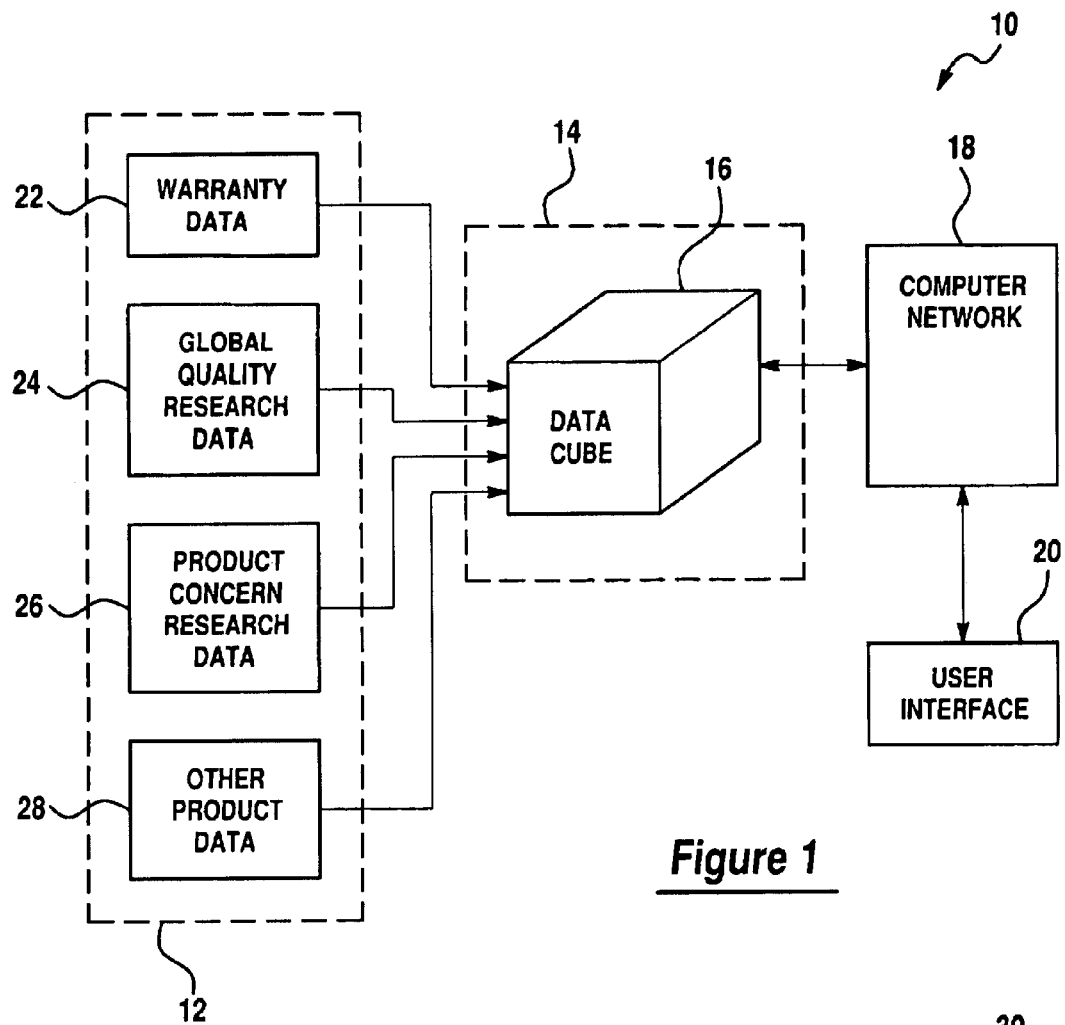
FIG. 1 is a block diagram illustrating one non-limiting embodiment of a system which is used by the method of the preferred embodiment of the present invention to analyze vehicle data.

Referring now to FIG. 1, there is shown a system 10 which is utilized by the method of the preferred embodiment of the invention to organize and analyze product or vehicle information or data 12. In the preferred embodiment, the system and method described herein are adapted for use by or within a manufacturing company, and more particularly by or within an automotive vehicle manufacturing company.

In the preferred embodiment of the invention, data 12 comprises a variety of vehicle information or data 22–28 which arises or emanates from various sources. In the preferred embodiment of the invention, data 22 comprises conventional warranty data regarding automotive vehicles which may emanate from sources such as automotive vehicle dealers and/or from an automotive company's warranty claims department. Data 12 preferably includes without limitation warranty information relating to comments from customers and mechanics; specific warranty claims made submitted to the company; the identification number or ("VIN") number of the vehicles to which the comments and claims relate; the type (e.g., luxury, mid-size, truck, sport-utility) and model of the vehicles to which each of the comments and claims relate; the geographic areas or regions in which the vehicles were manufactured and now reside; the specific systems, components or portions of the vehicles to which the comments and claims relate; and the cost of the required repairs or claims. In the preferred embodiment, this information is further refined or pre-processed to include values such as the amount or number of repairs that are reported per vehicle for a certain vehicle type or model (e.g., repairs per thousand units or "R/1000"), the average cost per vehicle or unit ("CPU") of the repairs or claims, and the total cost or repairs per vehicle or vehicle type.

Global quality research data 24 includes quality data relating to products or vehicles which are manufactured by the company and its competitors. Data 24 is obtained and acquired from consumer surveys, phone interviews and "follow ups", and other industry research. In the preferred embodiment of the invention, data 24 includes information regarding problems or "things gone wrong" with the vehicles, vehicle systems and/or vehicle components; the specific makes, types and/or models of vehicles; the geographic locations of manufacture and use of the vehicles; and customer satisfaction with the vehicles. In the preferred embodiment, this information is further refined or pre-processed to include values such as the amount or number of problems or "things gone wrong" ("TGW") per vehicle for a certain vehicle type or model (e.g., "things gone wrong" per thousand units or "TGW/1000"), and a customer satisfaction percentage per vehicle or vehicle type (e.g., "% Sat").

Product concern research data 26 includes data regarding customer and consumer concerns and/or desires relating to products or vehicles which are manufactured by the company and its competitors. Data 26 is obtained and acquired from customer and consumer surveys and other conventional consumer research and information acquisition methods. In the preferred embodiment of the invention, data 26 includes information regarding concerns and/or desires. The data 26 further includes information relating to consumer concerns and desires regarding specific makes, models and types of vehicles, vehicle systems and/or vehicle components; geographic locations of the customers and/or consumers having the concerns and/or desires; the age of the customers and/or consumers; the gender of the customers and/or consumers; and other attributes of the customers and/or consumers. In the preferred embodiment, this information is further refined, processed and/or quantified. For example and without limitation, the data 26 is organized/sorted by age group, vehicle type (e.g., luxury, mid-sized, sport-utility), and the nature of the concern or desire (e.g., each concern or desire is assigned a code or value by which it can be indexed or referenced).

Data 28 includes other "non-traditional" data indicative of vehicle quality and/or consumer satisfaction, concerns and/or desires. Data 28 is obtained and acquired from company and industry research, and is assigned an applicable metric by which it can be analyzed and compared.

System 10 includes a conventional computer and/or data system 14 which includes one or more multi-dimensional relational databases or "data cubes" 16, which are resident within the memory of computer system 14. In the preferred embodiment of the invention, data cubes 16 are "formed", organized, accessed, displayed, and analyzed by use of "On Line Analytical Processing" technology, which is commonly referred to as "OLAP" technology, and which is resident within computer system 14. In one non-limiting embodiment, each portion or type of data (e.g., data 22, 24, 26, and 28) is stored and/or organized within a separate "data cube", and the data cubes 16 are "interconnected" or "interrelated", thereby allowing a user to access, search, analyze and/or display the data within any one or more of the data cubes simultaneously. The information within data cubes 16 may be accessed, displayed and analyzed over a server (e.g., a web server) and a conventional internal and/or external computer network 18 which may comprise a conventional Local Area Network or "LAN" or a global computer network such as the World Wide Web ("Web") or the "internet".

A conventional user interface 20, which may comprise one or more conventional computer software and hardware interface components and/or devices (e.g., "browsing" or querying type software, a screen, monitor, keyboard, mouse, hand-held device, and/or any other conventional interface devices), is used to access, analyze and display information stored within data cube 16.

Figure 2:
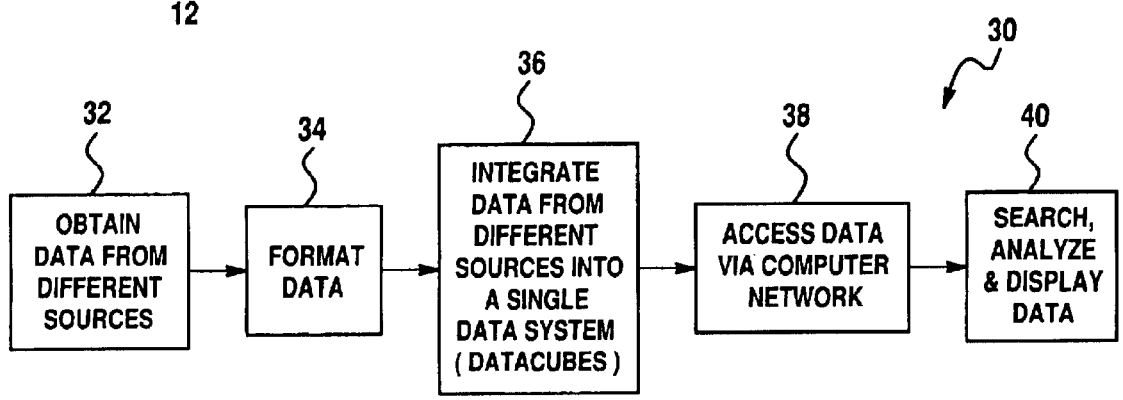
FIG. 2 is a block diagram illustrating a method for organizing and analyzing vehicle data which is performed in accordance with the teachings of the preferred embodiment of the present invention.

Referring now to FIG. 2, there is shown a method 30 for organizing, analyzing, searching and displaying data 12. In block or step 32, data 22, 24, 26 and 28 are collected, acquired and/or provided in a conventional manner from their respective sources. Particularly, the data 22–28 is acquired from conventional such as comments from customers and mechanics, from specific warranty claims made on certain vehicles, from company and industry surveys and research, from internet and phone marketing or research data, and/or from any other suitable traditional or non-traditional data information acquisition methods. In step 34, the information or data 12 is formatted, compiled, provided and/or stored in an electric/magnetic medium (e.g., upon one or more computer files and/or disks) and is transferred, inputted or downloaded in a conventional manner into the multi-dimensional relational database or data cubes 16. In the preferred embodiment of the invention, step 34 is performed, at least in part, by use of conventional data transformation software.

In block of step 36, all of the data or information 22–28 is integrated within a single data system 14 and is stored within data cubes 16. In the preferred embodiment of the invention, OLAP technology is used to arrange and store each data 22, 24, 26, and 28 within separate data cubes 16 which are interconnected or interrelated. In other non-limiting embodiments all of data 22–28 is stored within a single data cube. In the preferred embodiment, the data 12 stored within data cubes 16 is preprocessed into "data summaries" and is stored in an interrelated manner so that it can be accessed and indexed by any one or more user selected attributes or categories.

In block or step 38, the data cube 16 is accessed via a computer network (e.g., network 18) by a user desiring the information or data 22–28 or portions of the information or data 22–28. As illustrated in functional block or step 40, a user may utilize interface 20 to selectively analyze, query and display the data within the data cube 16 in a variety of user-selected formats (e.g., graphical formats, chart type formats and table formats). In the preferred embodiment of the invention, the user interface 20 is substantially similar in function to conventional navigational or "Web browser" type interfaces, thereby allowing users to easily and intuitively navigate through an analysis, reverse steps, and explore various paths.

By entering commands, queries and data through interface 20, a user may sort, categorize, analyze and display different categories and attributes and types of data. Particularly, a user may broaden or narrow the types of data displayed or may display and compare different types of data concurrently. For example and without limitation, a user to sort and/or select consumer satisfaction, concerns and/or desires data by gender of the consumers; by age of the consumers; and/or by car type (e.g., luxury, trucks, mid-sized or all vehicle types). A user can further select or sort vehicle data acquired in a certain year (e.g., 2000); data related to a specific geographic region (e.g., North America or a specific country or state); data related to specific makes, models and years of vehicles; data corresponding to particular vehicle systems (e.g., engine/transmission, drive train, all vehicle systems); data emanating from a specific source (e.g., all paid warranty claims); data related to particular concerns; and data relating to specific components of a vehicle. In this manner, a user may effectively "drill-through" data cube 16 to receive, view and analyze highly specified information. A user may further "drill" further into different cubes 16 concurrently and compare the received data.

By integrating the data 22–28 within a single data system 14, a user of method 30 can access data from a variety of sources concurrently. Hence, a user can analyze, compare, and display different types of data at the same time and through the same interface. Also, users of the present method 30 are only required to learn a single intuitive Web-browser type application to access a variety of data 22–28. Particularly, the information is sorted and displayed in a "Web" browser format which maintains the "look and feel" of conventional Web or "internet" conventions. In one non-limiting embodiment, the data cubes 16 can be accessed, analyzed and queried by use of conventional Web-browsing software.

Furthermore, the OLAP technology and data cubes 16 used with the present method 20 allows the data 12 to be more easily, efficiently and quickly analyzed and displayed. For example and without limitation, the data cubes 16 and OLAP technology allows a user to receive and view information in pre-processed data summaries (e.g., in graphs, charts, tables) and to analyze the data prior to formulating queries (e.g., queries can be based on a visual analysis). In this manner, the querying of the multi-dimensional database 16 can be performed more efficiently. Furthermore, the method 30 and system 10 allow a user to obtain results of their queries and/or investigations immediately and online. Moreover, the preprocessed data summaries significantly reduce the processing time required for users to perform queries and to select, summaries and sort the results of the queries, relative to prior systems and methods.

Additionally, in contrast to traditional query method and systems which required a user to first obtain data from a database and then import the data into other software to display the results, the present method 30 and system 10 allow a user to display a easily select one or more types of displays in order to view and analyze the received data in real time over the Web or LAN.

In this manner, the present invention allows vehicle information emanating from various sources to be integrated, analyzed, and reviewed concurrently and in an efficient manner, and to be viewed in one or more user-selected unambiguous and concise formats. Hence, the present invention facilitates the data analysis process and allows a company to efficiently determine and improve the quality and innovation of their manufactured products or vehicles.

It should be understood that Applicant's invention is not limited to the exact method 30 illustrated in FIG. 2, but that various changes and/or modifications may be made without departing from the spirit and/or the scope of Applicant's invention. For example, in other embodiments of Applicant's invention, additional or different steps and procedures may be undertaken to further maximize the efficiency of the data review and analysis process.

What is claimed is:

1. A method for analyzing product information comprising the steps of:

obtaining warranty data;

obtaining global quality research data;

obtaining product concern research data;

formatting said obtained warranty data, global quality research data, and product concern research data;

integrating and storing said formatted warranty data, global quality research data, and product concern research data within a single multidimensional relational database; and selectively accessing said stored formatted warranty data, global quality research data, and product concern research data by use of a single user interface.

2. The method of claim 1 wherein said stored data is accessed over a global computer network.

3. The method of claim 2 wherein said user interface comprises a Web browser.

4. The method of claim 3 further comprising the steps of:

displaying said selectively accessed data in a graphical format;

visually analyzing said displayed data; and querying said multidimensional database based upon said visual analysis.

5. The method of claim 4 wherein said product comprises a vehicle.

6. The method of claim 5 further comprising the steps of:

pre-processing said warranty data to include repairs type data and cost per unit type data; and pre-processing said global quality research data to include things gone wrong type data and customer satisfaction type data.

7. The method of claim 6 wherein said global quality research data and said product concern research data each includes competitor data.

8. The method of claim 7 further comprising the steps of:

obtaining non-traditional product data;

integrating and storing said non-traditional product data within said multidimensional database; and selectively accessing said non-traditional product databy use of said single user interface.

9. A method for analyzing vehicle information comprising the steps of:

providing first vehicle warranty data from a first source;

providing vehicle global quality research data from a second source;

providing third vehicle data from a third source;

providing at least one data cube;

providing OLAP technology;

integrating and storing said first, second and third vehicle data within said at least one data cube by use of said OLAP technology; and selectively and concurrently accessing said stored first, second and third vehicle data over a network by use of said OLAP technology.

10. The method of claim 9 wherein said third data comprises product concern research data.

11. The method of claim 10 wherein said network comprises the World Wide Web.

12. The method of claim 11 wherein said vehicle data is displayed, accessed and analyzed by use of a Web browser.

* * * * *